April 14, 1942.   H. E. SIPE   2,279,955
SHAFTING CONNECTION
Filed June 18, 1941   2 Sheets-Sheet 1
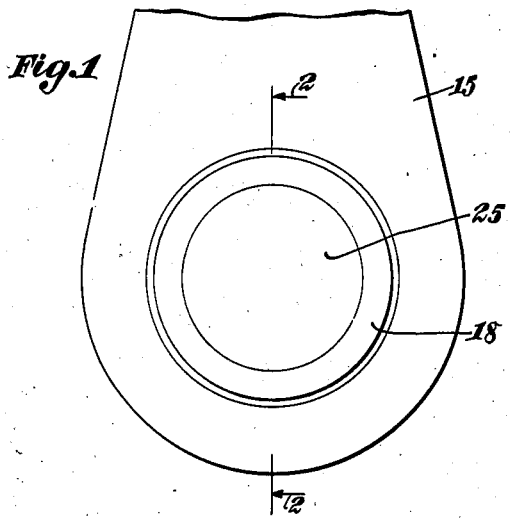
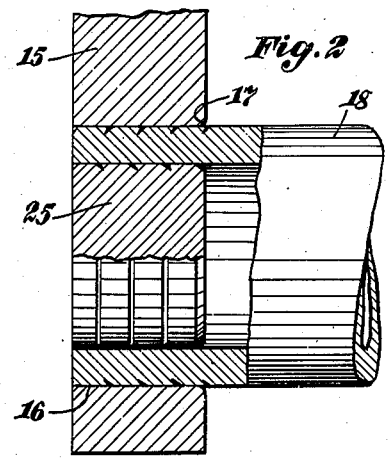
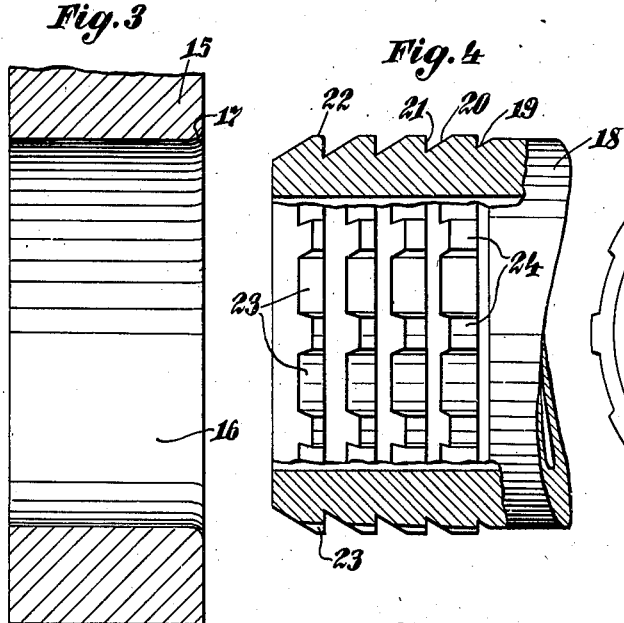
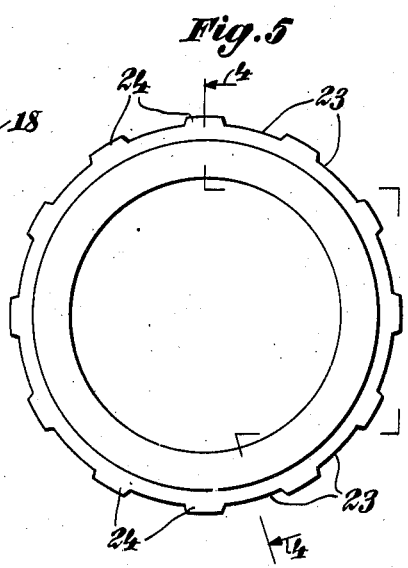
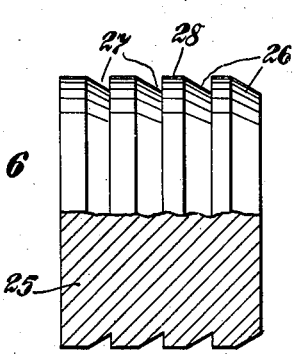
Harry E. Sipe,
INVENTOR.
BY Philip S. McKean.
ATTORNEY.

April 14, 1942.  H. E. SIPE  2,279,955
SHAFTING CONNECTION
Filed June 18, 1941  2 Sheets-Sheet 2

Harry E. Sipe,
INVENTOR.

BY Philip S. M<sup>c</sup>Kan
ATTORNEY.

UNITED STATES PATENT OFFICE 2,279,955

SHAFTING CONNECTION

Harry E. Sipe, New York, N. Y.

Application June 18, 1941, Serial No. 398,527

7 Claims. (Cl. 287—52.05)

The invention here disclosed relates to shafting connections and more particularly to hollow crank shaft structures, where strength must be combined with light weight.

Special objects of the invention are to provide an assembled crank shaft characterized by light weight and incorporating stronger connection characteristics than ordinarily obtainable in tubular forms of construction.

Other objects are to provide an assembled form of crank shaft or like structure having light weight and great torsional strength, which can be produced at low cost in preparation of the parts, both as to machining and actual material required.

A further object is to provide an assembled crank shaft or the like, the parts of which can be prepared without the need for special machine tools.

Additional objects and the novel features of invention will appear and are hereafter set forth and claimed.

In the accompanying drawings, certain practical commercial embodiments of the invention are illustrated, but structure may be further modified and changed all within the true intent and broad scope of the invention as hereinafter defined and claimed.

Fig. 1 is a broken end view of a hollow crank shaft structure having the invention incorporated therein.

Fig. 2 is a broken view with sectional portions appearing on substantially the line of 2—2 of Fig. 1.

Figs. 3 and 4 are enlarged part sectional views of the crank member with smooth socket and the tubular shaft member circumferentially and longitudinally grooved into segments which partly displace and are partially compressed by material of the socket member as the parts are forced together in a press fit, to form in effect interlocking keys and keyways, the sectioned portion of Fig. 4 appearing as on substantially the line 4—4 of Fig. 5.

Fig. 5 is an end elevation of the hollow shaft member previous to engagement with the socket member.

Fig. 6 is a part sectional side view of the expansion plug which is pressed into the end of the tubular member to lock it in its keyed relation.

Figure 7:
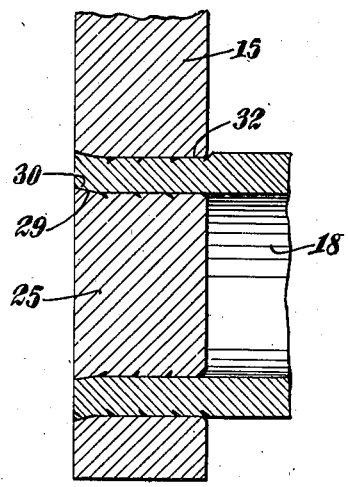

Fig. 7 is a broken sectional view of a modification in which the expanding plug is given a wedge formation at the outer end of the same.

Figure 8:
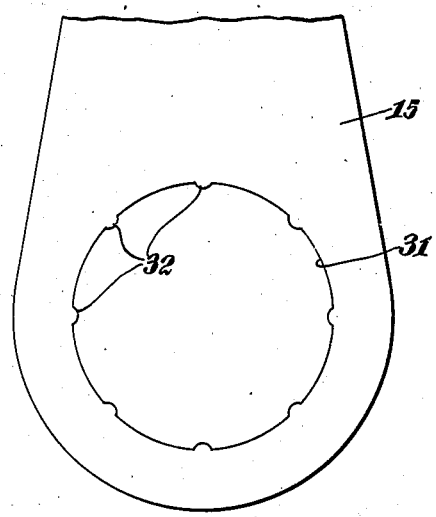

Fig. 8 is a broken face view of the crank element showing the socket modified to the extent of being formed with separated longitudinally extending small ridge elements.

Figure 9:
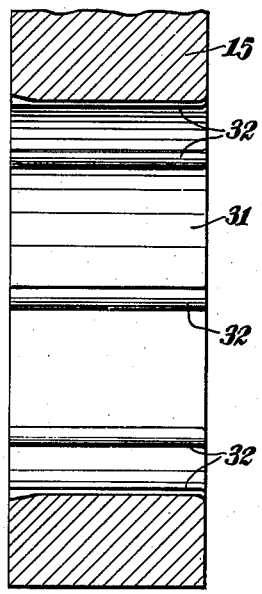

Fig. 9 is a broken sectional view of the latter member.

Figure 10:
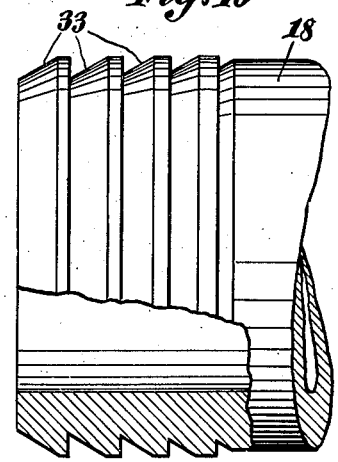

Fig. 10 is a broken sectional view of the hollow shaft member cooperable with the ridged socket.

Figure 11:
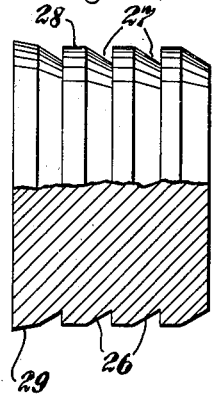

Fig. 11 is a part sectional side elevation of the plug member with the wedge end formation.

In the first form of the invention illustrated, the socket member 15, which may be a crank or other element to be mounted on or connected with a shaft, is formed with a substantially cylindrical socket 16, having a rounded entrance edge 17, Fig. 3.

The companion, tubular shaft member 18, is formed with annular grooves 19, of successively greater depth toward the end of the shaft and having bevelled or inclined inner walls 20, and abrupt outer walls 21, substantially rectangular to the axis of the shaft. These rectangular forward walls of the grooves are shown as equally spaced and extended inward successively to greater depths toward the end of the shaft and the inclined walls or faces 20, are shown all of substantially the same inclination and extending to the bottom of the gradually deeper walls, thus to form bevels or inclines of greatest extent at the end of the shaft and of successively lesser extent inward from the end and lands or plinths 22, which are narrowest at the end and of successively greater width back from the end of the shaft.

The equally spaced V-shaped grooves, so formed, thus provide between them a series of wedges or tapers of successively less depth and extent and having substantially cylindrical plinths of successively greater width, inward from the end. The outside diameters of the plinths of these tapers may be slightly greater than the shaft diameter, substantially as indicated in Fig. 4.

Longitudinal grooves 23, are shown cut through the tapers or inclined ridges, to less than the full depth of the annular grooves, thus to divide the annular ridges into separated segments 24, Fig. 4, which segments have the characteristics of the ridges, that is, with forwardly faced tapers of successively lesser depth and extent and top surfaces or plinths 22, successively longer, inward from the end of the shaft. The external diameter of the segments is slightly greater than the socket 16, so that when the shaft is forced with a press fit into the socket, these segments will be compressed and laid back in the grooves but in so doing, will compress the metal of the socket into shallow keyways, forcing metal so displaced laterally into the longitudinally extending grooves 23. The cooperative displacement of key segment metal of the shaft into keyways in the socket and displacement of socket metal from the keyways into the longitudinal grooves in the shaft member provides a double interlock between shaft and crank or other member, with comparatively little actual flow or displacement of material.

The narrower ridges and deeper grooves toward the end permit easier flow at the entering end, where the compressive forces may be most severe and the gradual increase in width also may compensate for such abrasion as may result from forcing the parts together.

The flow of material and interlocking engagement of the members each into the other is facilitated by use of ample lubricant in forcing the members together.

The rounded edge 17, at the entrance to the socket member avoids tearing of the socket material and possible formation of incipient lines of weakness.

The compression and displacement of material by the means described is so regulated and controlled as to avoid injury to either the tubular shaft or the member to which it is connected.

In some cases, and particularly for quite light shafting, it may be desirable to reinforce and to additionally secure the parts in their interlocked relation.

In the illustration, a plug 25, Fig. 6, is provided, which may be tubular, or solid as shown, and this is forced, with a drive fit into the open end of the hollow shaft, after, or as a part of the engagement of the latter in the socket member. This plug is shown as having a succession of tapers 26, with intervening rectangular sided annular grooves 27, which receive the material of the plinths or outer diameters 28, compressed and laid back by forcing the plugs into the shaft ends, as indicated in Fig. 2.

The inserted plug by serving as an internal support for the tubular wall makes it practical to use a particularly thin walled shaft in this form of connection.

The form of the plug may vary. Thus as shown in Fig. 11, it may be given a wedge face 29, at the last or on more than one of the taper ridges 26, so as to effect a slight expansion of the shaft end, as represented at 30, in Fig. 7.

Figs. 8 and 9 show how the socket 31, instead of being smoothly cylindrical, may have a series of spaced longitudinally extending small rounded longitudinal ridges 32, which by compression of material will key their way, by displacement, into the bevel faced annular ridges or tapers 33, Fig. 10.

In all forms of the invention, the preparation of the parts is relatively simple, requiring no special machine tools and the engagement and interlocking of the parts can be effected in any desired angular relation.

What is claimed is:

1. A torsional drive connection for hollow shafting, in which the shafting of tubular formation, is provided with a series of longitudinally spaced V-shaped grooves forming a longitudinal succession of annular inclined tapers and in which the member to be connected with said shafting is provided with a socket which will receive said inclined tapers with a drive fit, said annular tapers being separated into longitudinal rows of inclined key segments by grooves intersecting said tapers, extending longitudinally of the shafting and of a depth less than the depth of said grooves defining and separating said succession of tapers.

2. A connection for hollow shafting, in which the shafting of tubular formation, is provided with a succession of annular tapers and in which the member to be connected with said shafting is provided with a socket which will receive said tapers with a drive fit, said annular tapers being separated into segments by grooves intersecting said tapers and extending longitudinally of the shafting and said longitudinal grooves extending to less than the full depth of said annular tapers.

3. A connection for hollow shafting, in which the shafting of tubular formation is provided with a succession of annular tapers and in which the member to be connected with said shafting is provided with a socket which will receive said tapers with a drive fit, said tapers being of successively greater extent and extending to successively greater depths toward the end of the shafting.

4. A connection for hollow shafting, in which the shafting of tubular formation is provided with a succession of annular tapers and in which the member to be connected with said shafting is provided with a socket which will receive said tapers with a drive fit, said tapers being of successively greater extent and extending to successively greater depths toward the end of the shafting and said tapers having circumferentially extending plinths of successively greater width inward from the end of the shafting.

5. A connection for hollow shafting, in which the shafting of tubular formation is provided with a succession of annular tapers and in which the member to be connected with said shafting is provided with a socket which will receive said tapers with a drive fit, said tapers being of successively greater extent and extending to successively greater depths toward the end of the shafting, said tapers having circumferentially extending plinths of successively greater width inward from the end of the shafting and longitudinal grooves extending to less than the depth of said tapers and separating the same into segments.

6. A pressed connection comprising the combination of a tubular member and a member socketed to receive the same with a drive fit, the outer engaging surface of said tubular member being circumferentially separated into longitudinally extending portions engaging by the drive fit as keys in said socketed member by longitudinally extending grooves and an expanding member in the form of a plug pressed into the bore of the tubular member, the engaging surface of which plug is circumferentially grooved.

7. A torsional drive pressed shafting connection, comprising the combination of longitudinally engaging members, one having a socket to receive the other with a drive fit longitudinally in respect to the axis of the shafting, the engaging surface of one member having transversely extending grooves spaced longitudinally of the axis of said member and forming a succession of bevel faced annular tapers and the companion engaging surface of the other member having longitudinally extending separated ridges of radial dimensions to displace the tops of said bevel faced annular tapers in the longitudinal driven engagement of said members and to thereby engage said longitudinal ridges as longitudinal keys in the material of said annular ridges.

HARRY E. SIPE.